May 12, 1970 — L. S. SCHNEPEL — 3,511,114

TORQUE WRENCH

Filed April 23, 1968 — 2 Sheets-Sheet 1

Inventor
Lawrence S. Schnepel
by Roberts, Cushman & Grover
Attys

May 12, 1970 L. S. SCHNEPEL 3,511,114
TORQUE WRENCH

Filed April 23, 1968 2 Sheets-Sheet 2

United States Patent Office 3,511,114
Patented May 12, 1970

3,511,114
TORQUE WRENCH
Lawrence S. Schnepel, 250 Goodman Hill Road,
Sudbury, Mass. 01776
Filed Apr. 23, 1968, Ser. No. 723,415
Int. Cl. F16h *1/32*
U.S. Cl. 74—801                                    8 Claims

ABSTRACT OF THE DISCLOSURE

A torque wrench comprising a holder supporting an input and output shaft with multiplying gearing therebetween characterized in that the component parts of the wrench are designed to have rolling contact throughout thereby to minimize the effect of friction and hence increase the efficiency of transmission.

BACKGROUND OF THE INVENTION

In my Pat. 2,510,483, dated June 6, 1950, there is illustrated a torque transmitting too comprising an annular holder within which there is rotatably mounted a rotor embodying input and output shafts and planetary gearing designed to multiply the force applied to the input shaft at the output shaft. The holder contains an internal ring gear and the rotor is provided with circular end plates which set into circular end bearings in the holder to hold the rotor and the gearing in concentric relation to the ring gear. As thus constructed, as the load is increased the side thrust between the end plates and the holder increases substantially thus reducing the efficiency of the output. It is the principal purpose of this invention to improve on the aforesaid structure in such a way as to minimize the effect of loading and friction between the component parts, so that substantially the same efficiency is afforded throughout the load range of the tool. This is achieved herein by providing rolling contact between all of the component parts of the tool which have contact and are moved relative to each other during transmission of the force applied to the input shaft to the output shaft.

SUMMARY

As illustrated, the tool comprises a holder embodying an internal ring gear having annularly arranged, axially disposed teeth and spaced parallel flat faces at right angles to the teeth. A bearing plate is mounted in rotating engagement with each of the faces of the holder, one of the plates having fixed to it a first shaft with its axis coinciding with the center of the annular gear and the other plate containing a bearing opening concentric with the axis of the annular gear. A second shaft is journaled in the bearing opening with a portion exteriorly of the outer side of the plate and a portion extending into the space between the plate and has fixed on it a center gear of smaller diameter than the annular gear. A plurality of planetary gears are mounted on bearing pins journaled between the bearing plates around the second shaft in mesh with the center gear and with the annular gear and there are means securing the plates to each other so that the latter and the gears supported therebetween constitute a rotor rotatably supported in the holder. Annular thrust bearings are mounted between the faces of the holder and the bearing plates, each comprising a plurality of radially disposed, circumferentially spaced needle bearings which affords rolling contact between the plates and the faces of the holder. Each of the plates contains circularly arranged bearing openings surrounding the axis of the shafts within which the ends of the bearing pins on which the planetary gears are mounted are disposed, and each bearing opening contains a needle roller bearing assembly for receiving the ends of the pins.

Figure 1:
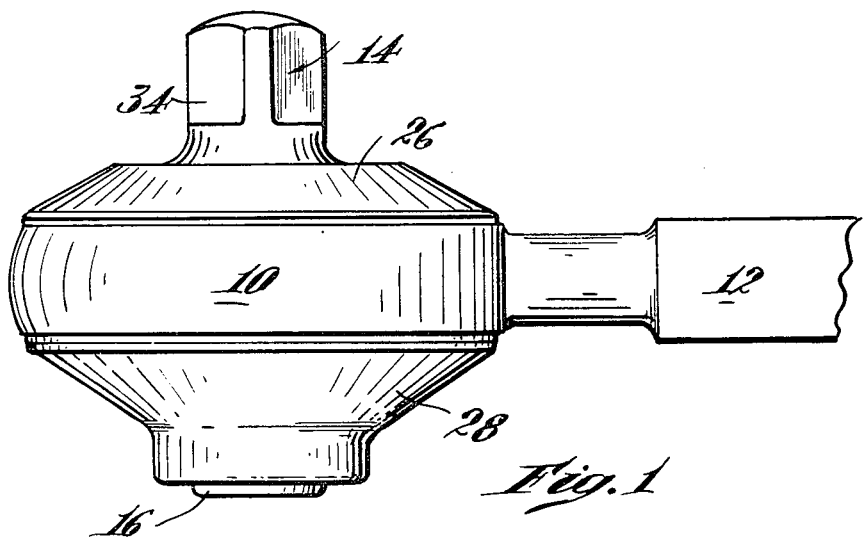
Figure 2:
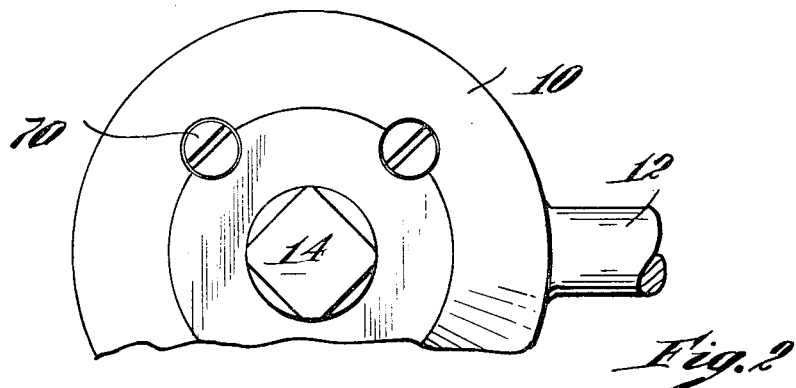
Figure 3:
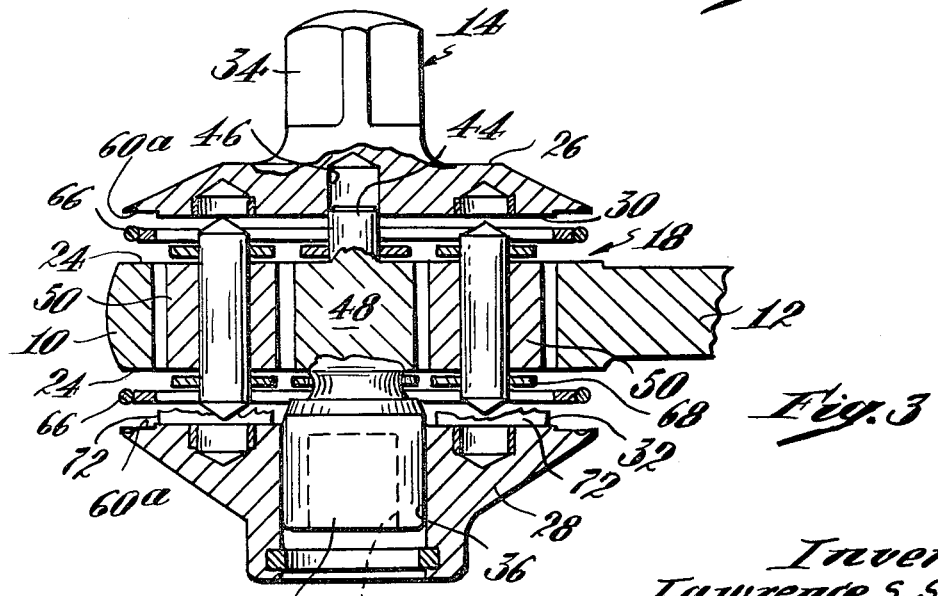
Figure 4:
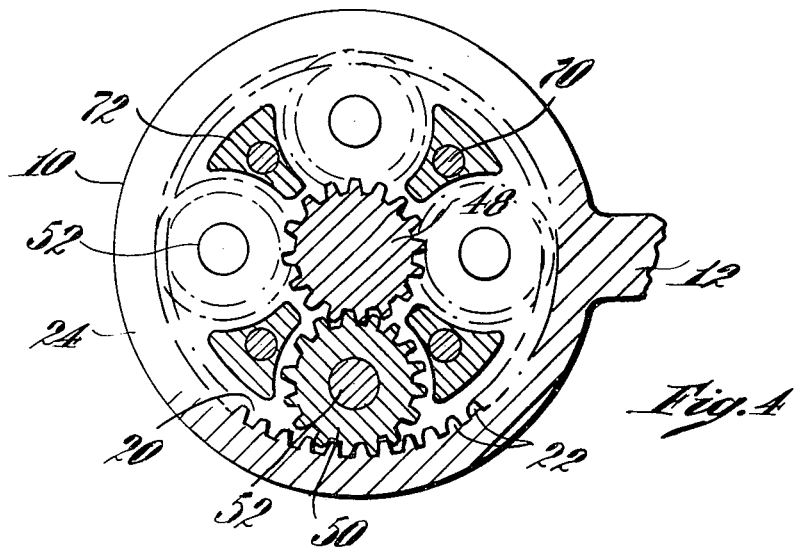
Figure 5:
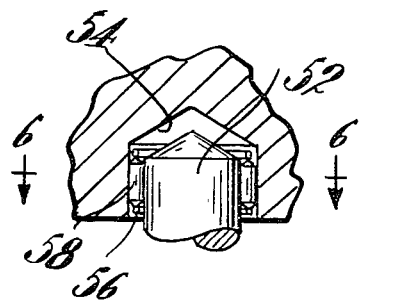
Figure 6:
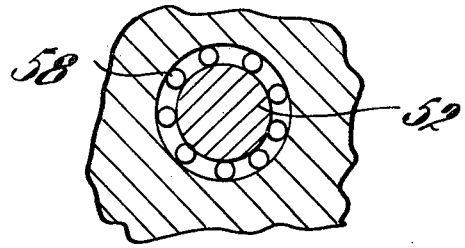
Figure 8:
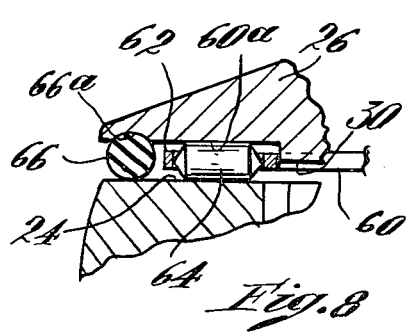
Figure 7:
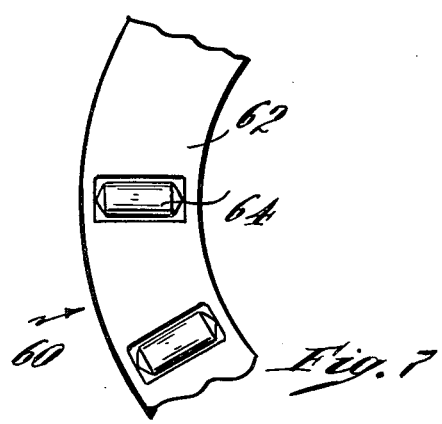
Figure 9:
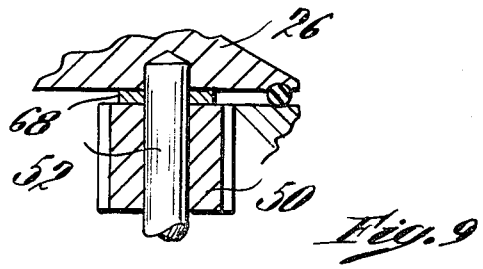

The invention will now be described in greater detail with reference to the accompanying drawings wherein:

FIG. 1 is an elevation of the tool;
FIG. 2 is a top fragmentary plan view;
FIG. 3 is an elevation with the component parts separated axially and partly in section;
FIG. 4 is a horizontal section taken on the line 4—4 of FIG. 3;
FIG. 5 is a fragmentary section of a cylindrical bearing assembly employed for supporting the ends of the bearing pins on which the planetary gears are mounted;
FIG. 6 is a section taken on the line 6—6 of FIG. 5;
FIG. 7 is a fragmentary plan view of one of the annular bearing assemblies employed for supporting the bearing plates in rolling engagement with the holder;
FIG. 8 is a fragmentary diametrical section, to much larger scale, showing the rolling engagement of one of the bearing plates with the holder and a sealing ring; and
FIG. 9 is a fragmentary diametrical section showing the tool constructed without roller thrust bearings.

Referring to the drawings (FIGS. 1, 2 and 3) the tool comprises a holder 10 provided with a radially extending handle 12, an input shaft 14, an output shaft 16 and gearing 18 for transmitting rotation of the input shaft 14 to the output shaft 16, multiplied by the gear ratio employed. The holder 10 is of annular configuration and contains internally thereof an annular ring gear 20 (FIG. 4) comprising a plurality of circularly arranged, axially extending teeth 22 which correspond substantially in length to the thickness of the holder. The opposite faces 24 of the holder are flat, parallel to each other and annular in configuration, providing smooth, substantially frictionless bearing surfaces.

A rotor is mounted in the holder 10 comprising a pair of end or bearing plates 26 and 28, circular in shape and generally frustoconical in diametrical section. The bearing plates are fixed to each other in spaced parallel relation, are concentric with respect to the axis of the ring gear, and have flat surfaces 30 and 32, respectively, which confront and are parallel to the surfaces 24—24 of the holder. The shaft 14 is fixed to the center of the bearing plate 28 with its axis coinciding with the center of the annular gear and has a portion 34 which is non-circular for receiving a wrench or other device by means of which a rotational force may be applied thereto. The bearing plate 28 contains a central bearing opening 36 in which the shaft 16 is rotatably mounted. The outer end of the shaft 16 contains a non-circular socket 40. The inner end of the shaft 16 extends inwardly between the plates 26 and 28 axially through the annular gear and has on its distal end a bearing pin 44 of reduced diameter rotatably supported in a bearing hole 46 provided at the center of the inner side of the bearing plate 26.

A center gear 48 of smaller diameter than the annular gear is fixed to the portion of the shaft 16 situated between the bearing plates (shown integral therewith herein) and around this gear there are mounted planetary gears 50 of such diameter as to mesh with the center gear 48 and the annular gear 20. The planetary gears, of which there are four shown herein, are mounted on bearing pins 52, the opposite ends of which are supported in bearing holes 54 (FIG. 5) in the bearing plates 26 and 28. Preferably the bearing holes 54 are of larger diameter than the ends of the bearing pins 52 and in each holder there is mounted a bearing assembly comprising a cage 56 of cylindrical configuration seated in the bearing hole which supports a plurality of needle bearings 58 for rolling engagement with the ends of the bearing pin seated therein.

Annular thrust bearings 60 (FIG. 7) are mounted between the bearing plates 26 and 28 and the annular bearing surfaces 24 of the holder, each thrust bearing 60 comprising a cage 62 which supports a plurality of radially extending needle bearings 64 in rolling engagement with the surfaces of the bearing plates and the holder. An annular recess 60a is provided in each of the plates 26, 28 to receive the outer sides of the cages 62 to hold them in concentric relation to the bearing surfaces 24. Preferably an O-ring 66 (FIG. 8) of resilient material is mounted around each bearing 60 to contain lubricant used in the tool. Optionally, but not necessarily, an annular groove 66a may be provided in each of the plates 26, 28 to receive and hold the O-rings 66 in place. Thrust washers 68 (FIG. 3) are mounted near the ends of each of the bearing pins between the ends of the planetary gears and the bearing plates.

The bearing plates 26 and 28 are secured to each other by bolts 70 (FIG. 4) so that they and the gears mounted therebetween comprise the rotor and turn as a unit within the holder. To prevent binding spacers 72 are provided on the bearing plates 28 which, by engagement with the bearing plate 26, hold the plates at a predetermined spacing.

As thus constructed, lateral pressure between the holder and the rotor is taken up solely by rolling contact between the two on the pitch line of the ring gear. The symmetrical arrangement of the planetary gears and ring gear provide a self-centering system which distributes the load applied, minimizes friction between the engaged components and minimizes any build up of friction as the load increases. The thrust bearings between the end plates and the holder and the roller bearings at the ends of the bearing pins on which the planetary gears are mounted in addition minimize friction losses between the end plates and the faces of the holder and the friction losses between the ends of the bearing pins and the end plates due to force couples in the axes of the input and output shafts. The total effect of the aforesaid construction is to provide an efficiency of approximately 97% to 98%.

It is within the scope of the invention as shown in FIG. 8 to build the tool without the thrust bearings between the end plates and the holder and without the bearings at the ends of the bearing pins which support the planetary gears. Such a tool embodies the major improvement in construction illustrated in FIGS. 1 to 7, to wit, rolling engagement of the planetary gears and the ring gear and so provides a tool which is substantially free of friction build up due to eccentric and/or high loads but which is less expensive to manufacture.

In either of its forms the elimination of the bearing support for the rotor within the holder reduces the overall weight of the tool approximately three pounds and the improved geometry of the tool afforded by contouring the peripheral edge of the holder and sloping the marginal edge of the end plates to meet the contour of the holder enables using the tool in cramped spaces which formerly could not be reached.

It should be understood that the present disclosure is for the purpose of illustration only and that this invention includes all modifications and equivalents falling within the scope of the appended claims.

I claim:

1. A torque transmitting tool comprising a holder containing an internal ring gear, said holder having flat end faces parallel to each other and perpendicular to the axis of the ring gear and a rotor mounted in the holder, said rotor comprising a pair of concentrically arranged spaced parallel plates secured in fixed relation to each other with their confronting surfaces parallel to the end faces of the holder, one of said plates containing at the center thereof at the inner side a bearing hole which extends partway through and the other a bearing hole which extends all the way through, a rigid shaft mounted between the plates, said shaft having at one end a bearing rotatably engaged with said bearing hole in the one plate and at its other end an output head rotatably engaged with the bearing hole in the other plate, said output head being accessible from the outer side of said other plate through said bearing hole for nonrotatable engagement with a part to which a torque is to be applied, a sun gear fixed to the shaft between the bearing and the head of smaller diameter than the ring gear, a plurality of planetary gears mounted between the plates in mesh with the sun gear and the ring gear, bearing pins rotatably supporting the planetary gears, said end plates containing bearing holes in which the ends of the bearing pins are rotatably supported for movement around the axis of the shaft with the plates as the latter are rotated in the holder and an input head fixed to the center of said one plate by means of which the rotor is rotated in the holder and the torque applied to the input head is transmitted to the output head.

2. A tool according to claim 1, wherein the planetary gears are arranged symmetrically with respect to the ring gear and have rolling engagement therewith on the pitch line of the ring gear.

3. A torque transmitting tool according to claim 1, wherein a flat annular thrust bearing is mounted between each plate and the end face of the holder with which it is parallel whereby the plates have rolling engagement with said end faces.

4. A torque transmitting tool according to claim 3, wherein said flat annular thrust bearings contain a plurality of peripherally spaced, radially disposed needle bearings.

5. A torque transmitting tool according to claim 3, wherein an O-ring is disposed about each annular thrust bearing between the plate and the face of the holder with which it is parallel.

6. A torque transmitting tool according to claim 1, wherein the end plates are substantially frusto-conical in diametrical section.

7. A torque transmitting tool according to claim 1, wherein a needle bearing assembly is mounted in each of the holes in the end plates for rotatably receiving the ends of the bearing pins.

8. A torque transmitting tool according to claim 7, wherein there are flat bearing washers mounted on the bearing pins between the ends of the planetary gears and the end plates.

References Cited

UNITED STATES PATENTS

| | | | |
|---|---|---|---|
| 2,510,483 | 6/1950 | Schnepel et al. | 74—801 |
| 2,583,140 | 1/1952 | Else | 74—801 |
| 2,606,472 | 8/1952 | Curtis et al. | 81—57 |
| 2,826,095 | 3/1958 | Dizius et al. | 74—801 X |
| 2,931,252 | 4/1960 | Ferguson et al. | 74—801 X |

ARTHUR T. McKEON, Primary Examiner